March 16, 1954 R. L. WELTON 2,671,949
METHOD OF MAKING TOOL JOINTS
Filed Nov. 23, 1948 2 Sheets-Sheet 2
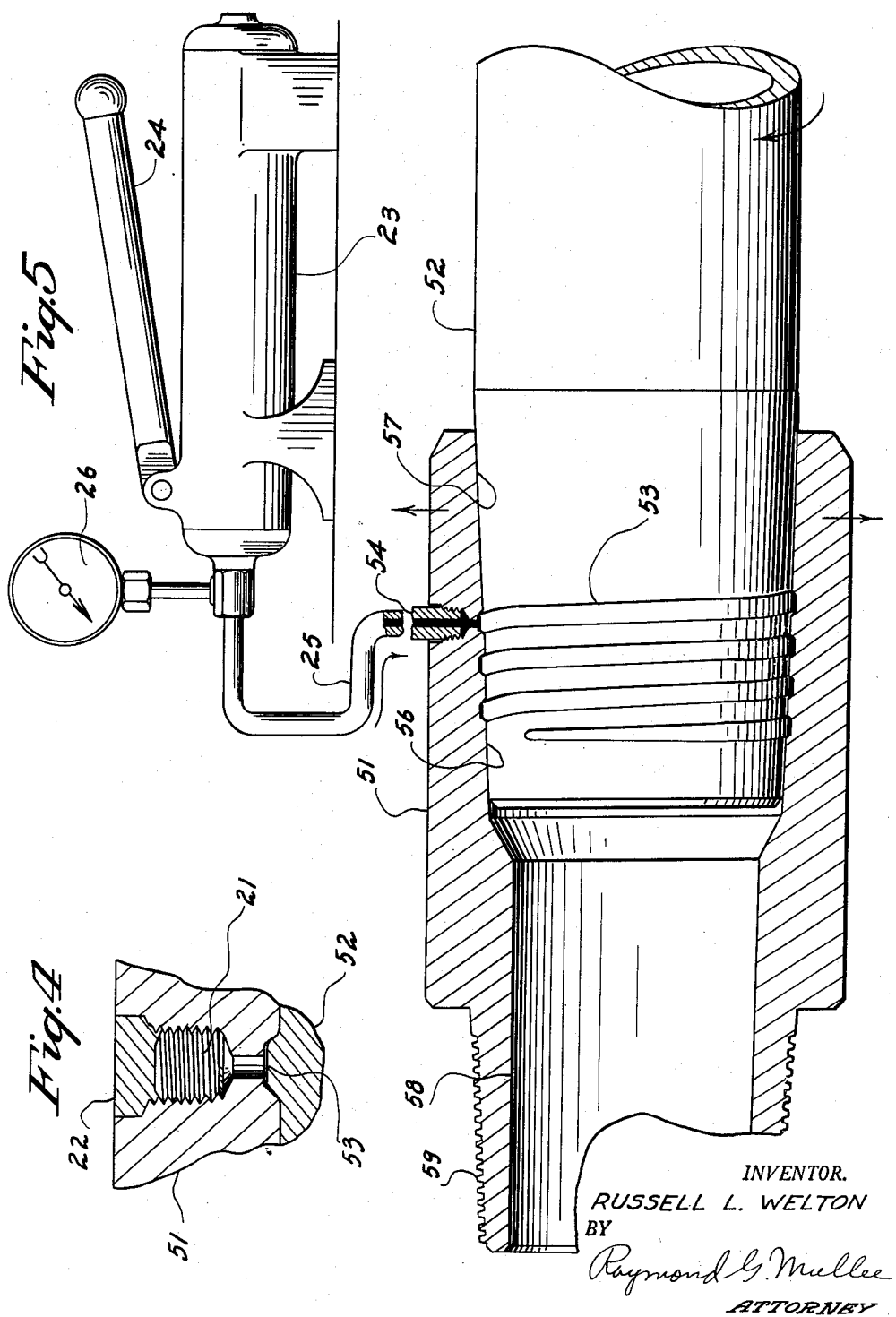
INVENTOR.
RUSSELL L. WELTON
BY
Raymond G. Mullee
ATTORNEY Patented Mar. 16, 1954

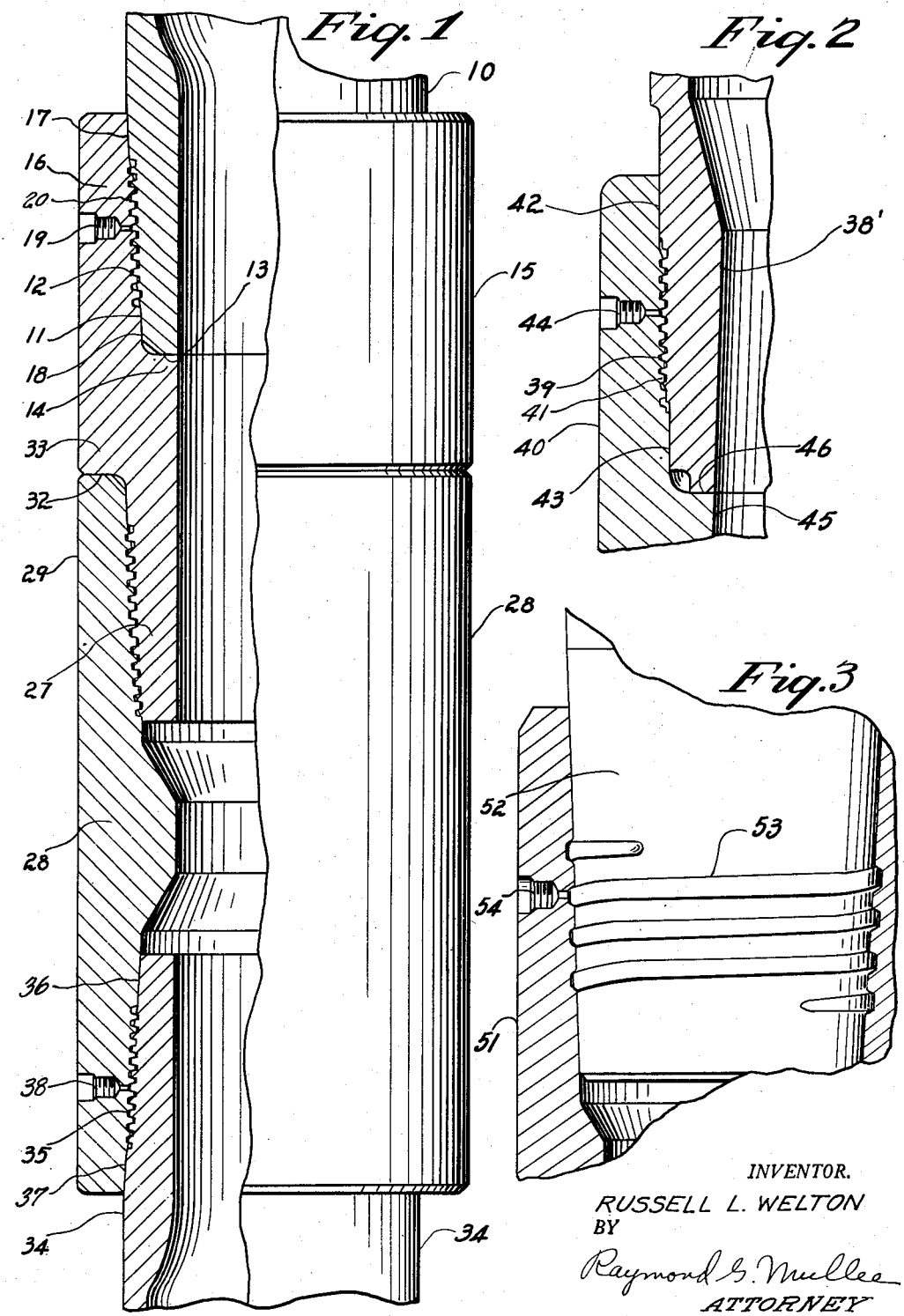

2,671,949

UNITED STATES PATENT OFFICE 2,671,949

METHOD OF MAKING TOOL JOINTS

Russell L. Welton, Franklin, Pa., assignor to Chicago Pneumatic Tool Company, New York, N. Y., a corporation of New Jersey Application November 23, 1948, Serial No. 61,661

2 Claims. (Cl. 29—148.2)

This invention relates to a shrink fit tool joint and to the method of making the same.

Heretofore, oil drill pipe joints have been made up by the shrink fit method utilizing portable stoves or ovens and cylinders of heating gas hauled to the location where the joints are to be made. Joint elements, such as the pin or box, are heated to a controlled temperature and expanded, then while so expanded, applied by hand to the pipe. With this method, there is always a possibility of the joint element freezing upon the pipe before the joint has been properly made. To replace such shrink fit joint elements, it is necessary that heat be applied to the joint while at the same time water is forced through the pipe until a temperature differential is reached that will allow the joint element, the pin or box, or whatever it may be, to be backed off by hand. In many cases, it has become necessary that the joint element be actually cut off with a cutting torch where it is difficult to remove the same by the application of heat, thereby requiring that a new thread be placed upon the pipe before connecting another joint element with the pipe. Considerable time and care are required to bring the joint elements and the pipe to the proper temperatures for making or disassembling the joint.

It is an object of the present invention to provide a method of making a shrink fit tool joint that can be made upon an oil drill pipe without the necessity of having to heat the joint element to a controlled temperature and wherein the joint element can be removed from the pipe without having to heat the joint and at the same time pass water through the pipe to cool it.

It is another object of the present invention to provide a method of making an oil drill pipe joint which can be easily and economically carried out in the field and wherein it is unnecessary to haul the drill pipe to an oil field shop to replace worn out joint elements or pipes.

It is another object of the present invention to provide a method of making a shrink fit tool joint wherein there is eliminated the possibility of one element freezing upon the other before the joint has been properly made up and wherein the elements are freely adjustable upon making the connection and upon disassembling the same.

For other objects and for a better understanding of the invention, reference may be had to the following detailed description taken in connection with the accompanying drawing, in which Fig. 1 is a fragmentary vertical view of an oil pipe tool joint formed according to the present method and with portions broken away and shown in section.

Fig. 2 is a vertical sectional view of a modified form of joint constructed according to the present method, but differing from the joint shown in Fig. 1 by using straight thread-like portions.

Fig. 3 is a fragmentary vertical sectional view of a still further form of the invention, looking in full elevation upon the lands of a pipe and in section upon the joint element connected therewith, but the joint element still not fully set upon the pipe.

Fig. 4 is an enlarged fragmentary sectional view taken of the joint element and the pipe shown in Fig. 3, and of the threaded hole for receiving the expanding fluid with plug and solder therein.

Fig. 5 is a fragmentary view of the joint element and pipe shown in Fig. 3, but with the joint element more set upon the pipe and with the hydraulic pressure pump shown in full and connected to the thread fluid receiving hole of the joint element.

Referring now particularly to Fig. 1, 10 represents a drill pipe having a tapered end 11 with a thread-like portion 12 thereon. This tapered end 11 has an end face 13 adapted to be engaged by a shoulder 14 of a pin or joint element 15 having a socket formation 16, internally tapered and with a thread-like portion to receive the threaded end 11 of the drill pipe 10. The thread-like portion of the socket formation 16 of the pin or joint element 15 has a normal or pre-assembled pitch diameter smaller than the pitch diameter of the thread-like portion 12 of the pipe end 11. The pin or joint element 15 is first screwed onto the pipe and as far as it can go by hand to provide a fluid tight engagement between the pin or joint element 15 and the pipe end 11. Such engagement is effected adjacent the opposite ends of the thread-like portions as indicated at 17 and 18. There is thus initially provided sufficient sealing engagement of the pin and pipe so as to prevent the leakage of hydraulic fluid when admitted to a space 20 between the thread-like portions.

In the pin 15 there is a threaded hole 19 to which an oil line or hose 25 is connected, Fig. 5. Fluid is admitted to the pin slowly at first to expand the pin, then to a high pressure approximating 20,000 pounds per square inch. As the pressure is applied, the pin socket formation 16 is expanded and the pin is turned further onto the pipe end 11 to finally bring the shoulder 14 into engagement with the pipe end face 13 on the end of the pipe. The shoulder comes to an abrupt stop against the end face 13 of the pipe. The fluid will have entered spiral space 20 between the thread-like portions of the pin and pipe. This space 20 spreads over a considerable area of the pin and pipe to apply a uniform and well distributed pressure to all portions thereof surrounding the pipe end whereby to uniformly expand the pin. Finally, the pressure is released to shrink the pin upon the pipe.

With the parts in place and shortly thereafter, a plug 21 is threaded into the hole 19 and the outer end thereof is filled or sealed with lead or solder as indicated at 22, Fig. 4. In this manner, the threads will be deprived of water and of foreign matter which might prove harmful to the joint. This entire operation is done without the application of heat.

The fluid pressure is supplied with a hand hydraulic pump 23, Fig. 5, having a pump handle 24 adapted to be moved up and down and a hydraulic pipe line or hose 25 adapted to be connected to the threaded hole 19. The pump 23 has pressure gauge 26 from which the pressure of the fluid being supplied to the joint may be determined.

The thread-like portions on the pipe and on the pin socket formation have a thread structure with a three-fourths of an inch taper per foot on diameter, 5 Acme threads per inch, the width of flat at the top being .074 of an inch, the width of flat at the root being .069 of an inch, and a thread depth of .110 inch. The interference fit or difference between the normal size of the pipe and the normal size of the pin opening measured along the pitch diameter is .018 inch, the pipe being larger than the pin opening. The amount of axial movement of the joint element from the hand tight position is 9/16 of an inch or 2.8 turns.

The pin 15 has a depending externally threaded tapered portion 27 of similar diameter and shape as of the end 11 of the pipe 10 for receiving a box or joint element 28 having an internally threaded tapered socket formation 29 to match the pin tapered portion 27. The coupling threads on the pin and box elements are standard and are for the purpose of coupling and uncoupling the pipe sections as they are placed in or removed from the oil well. The box 28 is a part of another pipe section 34 and is assembled to the pipe 34 in the same method as described above. The end face of the box, as indicated at 32, is brought into flush engagement with a shoulder 33 of the pin 15 as the pipe sections are brought together.

The drill pipe 34 has a tapered thread-like portion 35, but the joint which is made between the box and the pipe 34 is a modification of the invention. The seal is wholly effected between tapered portions adjacent the thread-like portions and as indicated at 36 and 37. Fluid under pressure is applied to this union through a threaded hole 38 to which is attached the hydraulic pipe line 25. This hole 38 may be likewise sealed off with a plug 21 and solder 22, Fig. 4. A complete shrink fit tool joint of the box and pipe has thus been formed without the application of heat.

According to the form of the invention shown in Fig. 2, the pipe and pin have straight thread-like portions by which the joint is made. A pipe end 38' is provided with a thread-like portion 39 throughout a substantial length upon the same, and a pin or joint element 40 is similarly provided with internal thread-like portion 41 to match with the thread-like portion 39 of the pipe end 38'. Sealing engagement is initially made by hand, turning the box upon the pipe end and at the opposite sides of the thread-like portion as indicated at 42 and 43. Thereafter fluid pressure is supplied through a threaded hole 44 and the pin 40 is expanded whereby to allow the pin 40 to be turned onto the end of the pipe 38' so that it has flush engagement with a shoulder 45 of the pin at 46. This joint is likewise finished off by plugging the hole 44 and sealing with solder in the manner as above described. The thread structure may be of the same type and dimension as with the tapered joint. This joint can be used on either the pin or the box.

In Figs. 3, 4 and 5, there is shown a connection formed with a pin or joint element 51 and a pipe end 52. This pipe end has a thread-like portion 53 with a large head and is of a type whereby only about one quarter turn or 85° of a joint element from a hand tight position, is required. The normal internal pitch diameter of the pin opening is of less diameter than the normal pitch diameter of the pipe. As shown in Fig. 3, the pin 51 has been hand tightened upon pipe end 52. The hydraulic pipe line 25 is connected to a threaded opening 54 and upon application of hydraulic pressure by means of hand pump 23, the pin 51 is expanded and upon turning the pin 51 one quarter turn, it is brought into place and to the position shown in Fig. 5.

The opening 54 is sealed in the usual manner by plug 21 and solder 22. Large sealing areas are provided at points 56 and 57. The pin 51 has a depending connecting portion 58 to which a box element of another pipe section is connected. This depending portion is tapered and has standard threads 59.

When it is desired to remove the joint element and disconnect the drill pipes, it is only necessary to take to the field the hydraulic pump 23, melt the solder 22 out of the hole, remove the plug, connect the hose 25 to the hole. Pressure is applied and the joint element is backed off the pipe. The removal operation is as simple as the assembly operation.

Generally, the method herein of forming a shrink fit connection consists of preparing parts adapted to be coupled together with threads such that the threads of the outer part are of slightly less pitch diameter than the pitch diameter of the threads of the inner part and providing a space between the threads of the parts, hand tightening the parts together, applying hydraulic pressure to the space between the threads of the parts and expanding the outer part, thereafter finally turning one of the parts upon the other part to bring the same into its final axial engagement therewith releasing the pressure to shrink the part and finally immediately plugging the opening of the outer part to which the hydraulic hose was connected.

The method of making the joint is not limited to joints for drill pipe, but may also be used for applying saver subs or tool joint elements to drill collars, grief stems and reamer bodies. It is more economical for the drillers to replace a saver sub in the field than it is to haul a drill collar or other part many miles to a field shop to have a threaded end reworked after it has failed in service.

While slight variations may be made in the detailed construction and in the manner of fitting the parts, it shall be understood that such variations shall be within the spirit and scope of the present invention as defined by the appended claims.

What is claimed is:

1. The method of assembling a shrink fit arrangement of parts comprising an inner part having a tapered threaded portion beginning at a point substantially removed from an end face of the inner part and tapered sealing surfaces at each end of the threaded portion, and an outer part having an internal tapered threaded portion adapted to engage the threaded portion of the inner part and having tapered sealing surfaces adapted to engage the sealing surfaces of the inner part and further having an opening leading to the internal tapered threaded portion, the threaded portion of the outer part having normal pitch diameter less than the normal pitch diameter of the threaded portion of the inner part, the threaded portions when engaged arranged to be close fitting at the thread flanks and to have a clearance space at the outer edge of the engaged threads, which method consists of fitting the parts together so that the sealing surfaces of the parts are engaged, introducing hydraulic pressure through the opening and into the clearance space to expand the outer part, rotating one of the parts so that the assembly is progressively tightened during application of hydraulic pressure, and releasing the hydraulic pressure to shrink fit the outer part upon the inner part when the parts are disposed in the desired axial position.

2. The method of assembling a shrink fit arrangement of parts according to claim 1, wherein the method further consists of sealing the opening in an air tight manner after the hydraulic pressure is released and the outer part is shrunk fit upon the inner part in the desired axial position.

RUSSELL L. WELTON.

References Cited in the file of this patent

UNITED STATES PATENTS

| Number | Name | Date |
| --- | --- | --- |
| 1,076,962 | Doble | Oct. 28, 1913 |
| 1,461,130 | Loughead | July 10, 1923 |
| 1,474,375 | Moore | Nov. 20, 1923 |
| 1,725,286 | Loughead | Aug. 20, 1929 |
| 1,817,808 | Eaton | Aug. 4, 1931 |
| 1,927,656 | Eaton | Sept. 19, 1933 |
| 2,062,407 | Eaton | Dec. 1, 1936 |
| 2,084,439 | Hamer | June 22, 1937 |
| 2,161,568 | Gignoux | June 6, 1939 |
| 2,211,173 | Shaffer | Aug. 13, 1940 |
| 2,348,293 | Hamer | May 9, 1944 |
| 2,448,232 | Muse | Aug. 31, 1948 |

FOREIGN PATENTS

| Number | Country | Date |
| --- | --- | --- |
| 539,139 | Great Britain | Aug. 28, 1941 |